United States Patent [19]

Russell et al.

[11] Patent Number: 4,687,054

[45] Date of Patent: Aug. 18, 1987

[54] LINEAR ELECTRIC MOTOR FOR DOWNHOLE USE

[76] Inventors: George W. Russell, Rte. 1, Box 164A; Larry B. Underwood, 1309 Henderson, both of Bridgeport, Tex. 76026

[21] Appl. No.: 714,564

[22] Filed: Mar. 21, 1985

[51] Int. Cl.⁴ .................. E21B 43/00; F04B 17/04
[52] U.S. Cl. ............................. 166/66.4; 166/66.5; 166/68; 166/105; 417/417
[58] Field of Search .............. 417/417, 416, 554; 318/135; 166/381, 386, 53, 66.4, 66.5, 68, 105, 242, 107–111

[56] References Cited

U.S. PATENT DOCUMENTS

| | | | |
|---|---|---|---|
| 1,840,994 | 1/1932 | Winsor | 417/417 |
| 3,486,095 | 12/1969 | Sherwood et al. | 318/135 |
| 3,548,273 | 12/1970 | Parodi et al. | 318/135 |
| 3,895,281 | 7/1975 | Corbaz | 318/135 |
| 4,226,285 | 10/1980 | Moseley, Jr. | 166/66.5 |
| 4,291,761 | 9/1981 | Watson | 166/66.5 |
| 4,518,317 | 5/1985 | Inoue | 417/45 |
| 4,539,970 | 9/1985 | Rabson | 417/417 |
| 4,541,787 | 9/1985 | DeLong | 417/417 |
| 4,548,552 | 10/1985 | Holm | 417/417 |
| 4,562,385 | 12/1985 | Rabson | 318/135 |

FOREIGN PATENT DOCUMENTS 72872 7/1951 Denmark .................. 417/417

Primary Examiner—Stephen J. Novosad
Assistant Examiner—Hoang C. Dang

[57] ABSTRACT

Apparatus and method for operating a downhole sucker rod pump in which a downhole linear motor is controlled by a surface digital computer. The motor includes a number of coil sections circumfusing and spaced along the length of a non-magnetic tube, and an armature positioned coaxially inside the tube. The armature section includes a central mandrel of a non-magnetic material and a number of laminated armature sections circumfusing and spaced along the length of the mandrel. The tube is sized substantially the same as the production tubing, and the armature is not physically connected to the tube, such that the armature and the attached pump can be removed without removing the tubing. The coils are energized by electric power supplied by three electric conductors running from the surface. The power is selectively applied to each of the conductors in a predetermined sequence by a number of SCR switching devices controlled by the digital computer, such that the field coils are energized in manner to provide the proper attractive and repulsive forces to the armature section to cause it to move in the desired direction. By properly controlling the power switching sequence, the stroke length, speed, and duty cycle can be programmed and controlled.

8 Claims, 5 Drawing Figures

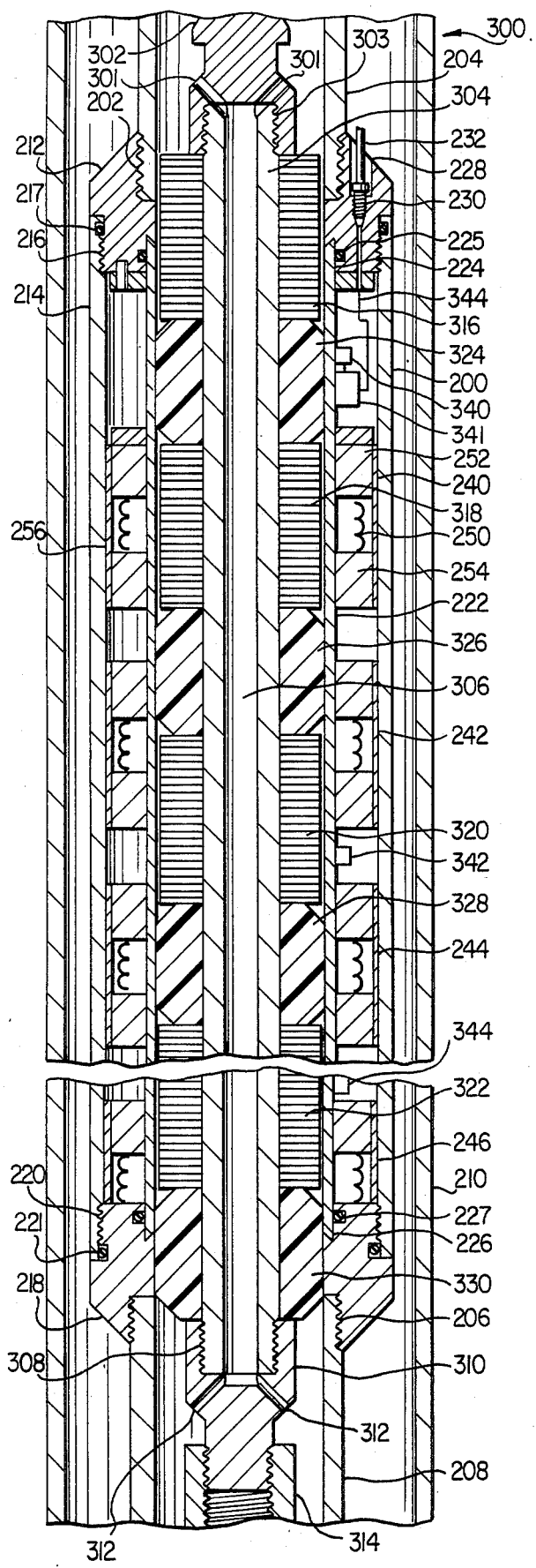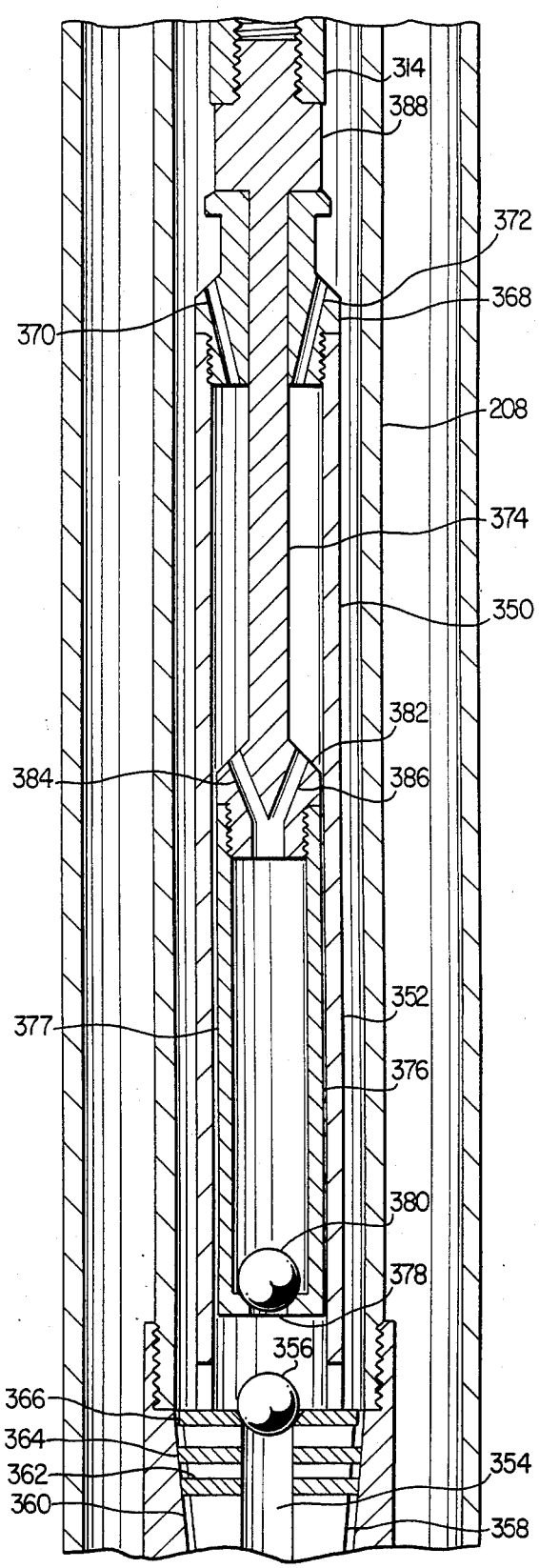
FIG. 2A
FIG. 2B

LINEAR ELECTRIC MOTOR FOR DOWNHOLE USE

BACKGROUND OF THE INVENTION

The invention relates to linear electric motors, and more particularly to such motors for downhole use in oil wells, and most particularly to such motors for operating sucker rod pumps in oil wells.

It has long been recognized that production of oil by means of sucker rod pumps driven by a surface mounted pumping jack, is very inefficient. Not only are the pumps and the sucker rod connecting the downhole pump to the pumping jack very expensive, but they also suffer from several technical problems.

One of the major problems is that, since most wells are not "straight", the sucker rod usually rubs against the tubing in a number of places. This problem is even more severe in wells that are intentionally directionally drilled and whose deviation from perfect straightness can be quite large. Not only does this wear the sucker rod and the tubing, necessitating the costly replacement of both, but the friction between the sucker rod and the tubing wastes energy and requires that more powerful motors be used to operate the pumping jack. In cases where the sucker rod completely wears through the tubing, there is also the problem of losing production from the production tubing back into the well casing. This rubbing action also causes the tubing to move up and down with the rods, necessiating the installation of tubing anchors.

Other problems associated with present sucker rod pumping systems are breakage of the bridle line connecting the pumping jack head to the polish rod, freezing of engine fluids in cold weather, pollution from engine exhaust, and leaks around the wellhead associated with the moving seal between the polish rod and the stuffing box.

Maintenance of sucker rod pumping systems is thus very costly not only in terms of replacement parts and labor but also in terms of lost production during the down time required for maintenance.

In addition to the technical problems associated with the prior art sucker rod pump systems, there are operational problems as well. Producing wells are usually scattered over a large geographic area, and the well owner must send a technician to each well on a regular basis to ensure that it is operating property, to adjust its operating characteristics to match the production pattern, to read gauges, etc. This operational pattern is both time consuming and costly. In low and marginal production wells, the problem is more severe since they require more constant attention to ensure that the pump operation accords with the abililty of the well to produce. For example, a pump on a marginal well must be constantly adjusted for maximum long term production and should be shut off when the well is temporarily pumped dry.

There are several types of information needed by reservoir engineers which can only be obtained under the current practice by shutting down the well and taking downhole measurements. One example is temperature which is an indicator of remaining formation production strength. New wells typically posssess a high bottom hole temperature, but the temperature drops as the well ages. In the current practice it is necessary to pull the pump in order to measure this parameter. Other important parameters include downhole pressure, which is useful in calculating reservoir volume, and fluid levels.

It is therefore the object of the present invention to provide a new and improved linear electric motor for driving a downhole sucker rod pump or other similar device, which overcomes the limitations and drawbacks of the prior art.

SUMMARY OF THE INVENTION

With this and other objects in view, the present invention provides a downhole linear motor for operating a downhole device positioned in a tubular conduit which includes a field coil portion integral with the conduit and coextensive in internal diameter therewith. An armature assembly is positioned inside the field coil assembly, and means are provided for attaching a fishing tool to the armature assembly, such that the armature assembly may be removed along with the attached downhole device without removal of the field coil assembly.

In another aspect of the invention, the field coil assembly includes a tube of non-magnetic material having substantially the same internal diameter as the tubular conduit. A plurality of electromagnetic coil assemblies are disposed about the tube and equidistantly spaced along its length. The armature includes a mandrel of a non-magnetic material centrally positioned in the tube and a plurality of armature sections equidistantly spaced along its length. The spacing of the coil assemblies is different from the spacing of the armature sections in order to prevent the armature from magnetically hanging up. Means are also provided for energizing the coil assemblies in a predetermined sequence, whereby electromagnetic attractive and repulsive forces are created between the coil assemblies and the armature sections to thereby move the mandrel longitudinally inside the tube.

In another aspect of the invention, means are provided for sensing the position of the armature sections relative to the field coils. Further means are provided for controlling the power to the field coil assemblies in response to the sensing means, whereby the mandrel is moved upwardly and downwardly in a reciprocating motion.

BRIEF DESCRIPTION OF THE DRAWINGS

The invention may be more fully understood by reading the following description of a preferred embodiment of the invention in conjunction with the appended drawings wherein:

FIG. 2A is a cross-sectional view of the downhole linear electric motor in accordance with the present invention;

FIG. 2B is a cross-sectional view of a downhole oil pump which may be driven by the linear electric motor of FIG. 2A;

DETAILED DESCRIPTION OF A PREFERRED EMBODIMENT

Figures 1, 3A:
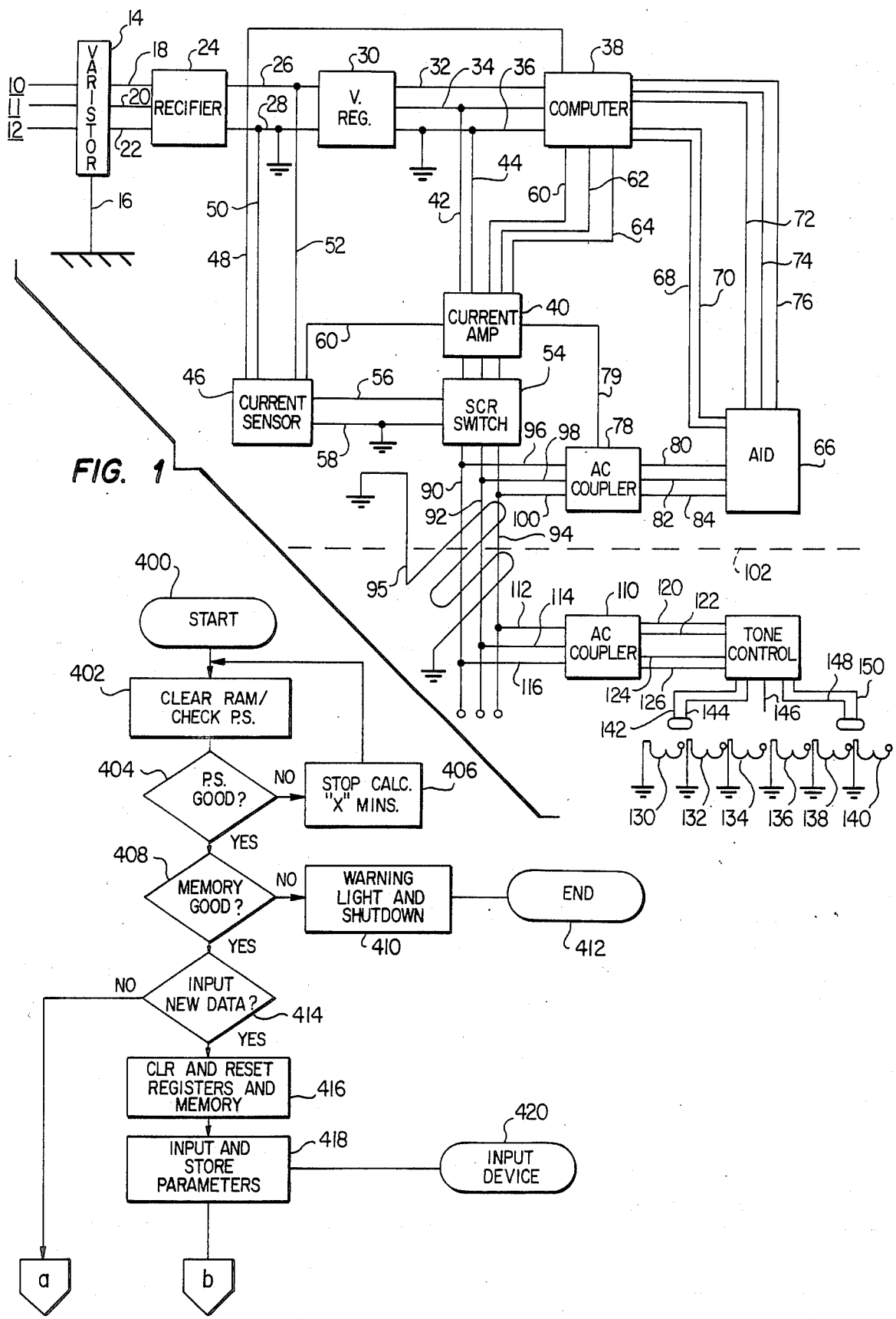
FIG. 1 is block diagram of the electrical aspects of the present invention.
FIG. 3A is a flow chart of a first portion of a computer program for operating the linear electric motor of the present invention.

Referring first to FIG. 1, electrical supply lines 10, 11, and 12, provide three phase alternating current of an appropriate voltage level to the present invention. Lines 10–12 are connected to a varistor bank 14, which is connected to ground by means of a line 16. The varistors used to form varistor bank 14 are preferably of the metal oxide variety. Varistor bank 14 is connected to a rectifier 24 by means of lines 18, 20, and 22. The output from rectifier 24 is connected via lines 26 and 28 to a voltage regulator 30, whose output is connected via lines 32, 34, and 36 to a digital computer 38. While computer 38 may be a computer of any suitable type, it is preferably a single board computer, such as the KIM-1 produced by MOS Technology, the SYM-1 produced by Synertek, or the AIM 65 produced by Rockwell. Voltage regulator 30 is also connected to a current amplifier 40 by means of lines 42 and 44, which are connected to lines 34 and 36, respectively.

The output of rectifier 24 is also connected in parallel to a current sensor 46 by means of lines 48, 50, and 52. Current sensor 46 is connected to an SCR (silicon controlled rectifier) switch bank 54 via lines 56 and 58, and to current amplifier 40 via line 59. SCR switch bank 54 includes twice as many SCR devices as there are lines to be controlled. As will be described hereinafter, three lines are controlled, and consequently six SCR devices are typically used in SCR switch bank 54.

The input-output lines of computer 38 are connected to current amplifier 40 by means of lines 60, 62, and 64, and to an analog-to-digital (A/D) converter 66 by means of lines 68, 70, 72, 74, and 76. Current amplifier 40 preferably includes optoisolators or similar devices to prevent damage to microcomputer 38 from voltage spikes created by the downhole coils to be hereinafter described. A/D converter 66 is connected to an AC coupler 78 via lines 80, 82, and 84. AC coupler 78 is also connected to SCR switch 54 by means of line 79.

SCR switch 54 is connected to lines 90, 92, and 94 which pass into the borehole to downhole apparatus to be described. Lines 90–94 are preferably embodied in a shielded cable as indicated by grounded line 95. Lines 90–94 are also connected to AC coupler/demodulator 78 via lines 96, 98, and 100, respectively. The use of three control lines 90, 92, and 94, allow the use of wire systems already developed for existing, commonly used centrifugal pumps.

The division between surface and downhole components is represented by dashed line 102. Downhole lines 90–94 are themselves connected to an AC coupler/modulator 110 by means of lines 112, 114, and 116, respectively; and AC coupler in turn is connected to a tone control circuit 118 via lines 120, 122, 124, and 126. Tone control circuit 118 is itself connected to a group of coil windings 130–140, and to position sensors such as 340 and 344, to be hereinafter described, by means of lines 142–150. Tone control circuit 118 is also connected to sensor package 119, which may include such individual sensors as temperature, pressure, and fluid level.

Referring next to FIG. 2A, the portion of the motor system intended for use downhole, and corresponding schemetically to apparatus below line 102 in FIG. 1, is shown. The linear motor generally designated by the numeral 200 is shown connected on its upper end by means of threaded coupling 202 to production tubing section 204, and on its lower end by means of threaded coupling 206 to tubing section 208. The entire downhole assembly is positioned inside well casing 210.

The housing for linear pump 200 comprises an upper end cap 212 which includes the previously described threaded coupling 202. Upper end cap 212 is connected on its lower end to cylindrical case 214 by means of threaded coupling 216, which is sealed against fluid leakage by means of O-ring 217. Cylindrical case 214 is in turn connected on its lower end to lower end cap 218 by means of threaded coupling 220, which is also sealed against fluid leakage by means of O-ring 221. Finally, lower end cap 218 is connected to tubing section 208 by the aforementioned threaded coupling 206.

A tube 222 preferably composed of fiberglass, brass, or non-magnetic steel is positioned coaxially within case 214 and is secured in cylindrical recess 224 in upper end cap 212 and cylindrical recess 226 in lower end cap 218. An O-ring 225 provides a fluid seal between tube 222 and upper end cap 212, and another O-ring 227 provides a similar seal between tube 222 and lower end cap 218. An alignment collar 213 is attached to tube 222 near its upper end, and an alignment pin 215 maintains collar 214 in a predetermined alignment with upper end cap 212. This prevents the wiring used in the linear motor from becoming tangled when the motor is assembled.

Upper end cap 212 has an opening 228 therethrough containing a threaded plug, or packoff nut, 230 which permits a cable 232 to pass from the annular area between tubing section 204 and casing 210 into the annular area between cylindrical case 214 and tube 222. In the preferred embodiment three such plugs to accommodate lines 90, 92, and 94 would be used, although any other number could be if required. Cable 232 is comprised of multiple conductors to accomodate at least lines 92–94 as previously described in connection with FIG. 1. The lines carried by cable 232 are connected inside cylindrical case to detectors and coils as hereinafter described. For the sake of clarity the precise connections of these lines to the detectors and coils are not shown in FIG. 2A, but their connection may be easily discerned from the description herein and from the schematic diagram of FIG. 1.

Positioned circumferentially about tube 222 inside cylindrical case 214 are a number of coil assemblies 240, 242, 244, and 246. Although four such coils are shown, it should be understood that any appropriate number may be used. For the sake of clarity only coil assembly 240 will be described, but it should be understood that all of the coils 240—246 are substantially identical.

Coil assembly 240 includes a multi-wire winding symbolically represented by the symbol 250 circumfusing tube 222. Also circumfusing tube 222 is a pair of rings forming pole pieces, preferably made of iron, one of which 252 is positioned directly above winding 250 and the other of which 254 is positioned directly below winding 250. Pole pieces 252 and 254 operate to concentrate the magnetic flux from coils 250 and orient it in the horizontal direction. Each of rings 252 and 254 has a groove on the side thereof to permit passage of the lead wires connecting winding 250 with wires emanating from cable 232 and to the other coils. Winding 250, ring 252, and ring 254 are secured together as a unit by means of a metal sleeve 256, which concentrates the magnetic flux created by winding 250 and thereby increases the strength of the magnetic field produced by coil assembly 240. Sleeve 256 is coextensive in length with the combination of winding 250 and rings 252 and 254 and is secured to them by press fitting or other suitable means.

In order to achieve the desired three to eight horsepower, the design of the coils is an important consideration. In order to minimize heat dissipation, the current used to energize the coils can be pulsating, which will take advantage of the electromagnetic inertia of the coil. In addition for optimum results the rings 252 can be made from rare earth materials, such as selenium-cobalt.

Although not specifically illustrated in the drawings, the wiring for the coils, such as 240, interconnect every other coil, either in series of parallel depending upon the voltage and current levels available. It is preferable to use as high a voltage as possible to avoid high resistive losses in high current-low voltage systems.

A linear armature 300 is slidably positioned inside sleeve 256 and is sized to pass through tubing section 204. Armature 300 is provided with a fishing neck 302 for retrieval of the armature and the attached sucker rod pump to described hereinafter. Fishing neck 302 has channels 301 therein to permit the passage of well fluids therethrough into the interior of tubing section 204.

Fishing neck 302 is attached to by means of a threaded coupling 303 to a mandrel 304 comprised of a non-magnetic material having a channel 306 therein. On its lower end mandrel 304 is attached by means of a threaded coupling 308 to a coupler 310 having a number of channels 312 therein to permit the passage of well fluids from the interior of lower tubing section 208 and into passage 306 in mandrel 304. Coupler 310 is connected by threads or other suitable means to another coupler 314.

Mandrel 304 has disposed thereabout a number of laminated magnetic armature sections 316, 318, 320, and 322, which are constructed from a multiplicity of stacked metal discs, preferably composed of a soft iron. Although four such sections are illustrated, it should be understood that any number might be used. The laminated structure helps to prevent the formation of efficiency robbing eddy currents when the motor is in operation. Magnetic secondary sections 316-322 are separated by nylon centralizers 324, 326, 328, and 330, which are somewhat toroidal in shape and are disposed about mandrel 304.

Centralizers 324-330 also serve to separate magnetic secondary sections 316-322 by an appropriate spacing. The width of centralizers 324-330 is chosen to provide a spacing between armature sections 316-322 that is different from the spacing between coil assemblies 240. Preferably the spacing is chosen such that when one coil and one armature section fully overlap along their entire lengths, the adjacent coil and armature section overlap by only two-thirds their lengths. The next adjacent coil and armature section would then overlap by one-third of their lengths, and this sequence would repeat for the remainer of the coil-armature pairs. In this manner when electrical power is applied to coil assemblies 240, there will be either an attractive or a repulsive force in all longitudinal positions of the armature assembly 300, and thus the armature assembly will not magnetically "hang up" at any such position.

Position sensors 340, 342, and 344 are attached to tube 222 at the top, middle, and bottom of the stroke of armature 300 and are connected to a downhole electronic package 341, which is connected by wires such as 344 to cable 232. Sensors 340-344 may be of any suitable type, but they are preferably Hall effect devices. Sensors for other parameters, such as fluid level, bottomhole temperature, PH, and pressure, may also be positioned in electronic package 341.

Referring next to FIG. 2B, a conventional sucker rod oil pump 350 is positioned inside tubing section 208 just below the linear motor 200 which was described in connection with FIG. 2A. The pump includes generally a closed barrel 352 having a lower valve comprising an opening 354 controlled by a ball 356. The lower end of barrel 352 is tapered and is configured to fit into a mating seat 360 which is threadedly connected to the lower end of tubing string 208. A number of nylon rings 362, 364, and 366 are disposed about tapered section 358 of pump 350 to provide a press fit connection between pump 350 and seat 360. Barrel 352 has a threaded plug 368 sealing the upper end thereof and having a number of lateral channels 370 and 372 to provide fluid communication between the interior of tubing string 208 and the interior of pump 350.

Plug 368 also has a central bore therethrough to slidably accommodate drive rod 374 of piston 376. Piston 376 includes a closed barrel 377 having a lower valve comprised of a lower opening 378 closed by a ball 380. The upper end of barrel 377 is threadedly connected to an enlarged lower section of drive rod 374, which forms a plug 382. Plug 382 has a number of channels 384 and 386 therein to provide fluid communication between the interior of piston 376 and the interior of barrel 352. Drive rod 374 has an upset section 388 above plug 368, which is threadedly connected to coupler 314 as previously described in connection with FIG. 2A.

The computer 38 as described in connection with FIG. 1 is appropriately programmed in accordance with the flow chart shown in FIGS. 3A and 3B. The start of the program is represented by block 400. The first step in the program is to clear the computer's random access memory (RAM), followed by a check in block 404 to determine whether the system power supply is operative. If the power supply is not good, then the program is directed to block 406, which delays further program execution for a predetermined length of time referred to a "x" in block 406. After the delay the program returns to block 402 to make another attempt to start the program sequence.

If the decision in block 404 is that the power supply is good, then program execution proceeds to block 408 which determines whether the RAM is good. If the RAM is bad, block 410 turns on a warning light, completes a shutdown sequence, and ends the program in block 412. If the RAM checks out as good, the program determines in block 414 whether the input of new data is required.

If input of new data is not required, then program execution jumps ahead to block 430 shown in FIG. 3B and to be described in connection therewith. However, if the input of new data is desired, the microprocesssor registers and memory are cleared and reset in block 416, and new parameters are input via device 420 and stored in block 418.

Figure 3B:
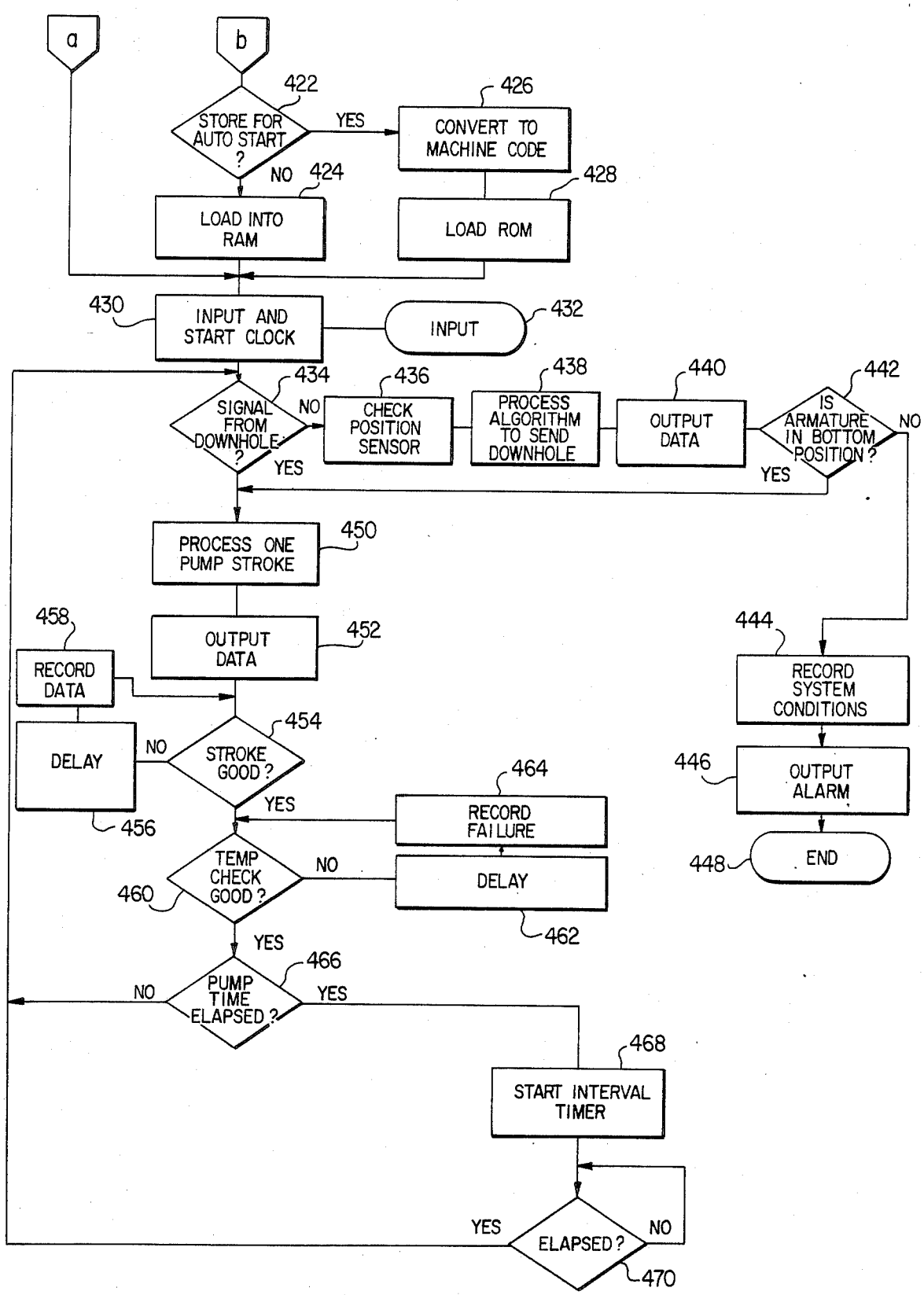
FIG. 3B is a flow chart of a second portion of a computer program for operating the linear electric motor of the present invention.

Referring now to FIG. 3B, the execution proceeds from block 418 to block 422, which determines whether the parameters input in block 416 are to be stored in read only memory (ROM) for autostart operation. If so, then the parameters are converted into machine code in block 426 and loaded into ROM in block 428. Program execution then proceeds to block 430 to be hereinafter described. If the parameters are not to be stored for autostart operation, then they are stored in RAM in block 424, from whence program execution proceeds to block 430, which inputs the initial clock value via block 432 and starts the clock operation.

Next block 434 checks for a signal from the downhole electronics to determine if the motor armature is properly positioned. If there is no downhole signal, i.e., the armature is not properly positioned, then the status of the position sensor is checked in block 436, and the algorithm to reposition the armature is processed in block 433. This is followed by a reposition command in block 440.

Next the position of the armature is again checked in block 442, and if the armature is properly positioned, then normal execution of the program proceeds to block 450. Otherwise, the current system conditions, including time, downhole pressure, downhole temperature, and electrical current being drawn are recorded in block 444. An alarm signal is then output in block 446, and the program execution ends in block 448 to permit the operator to determine the source of the problem.

If block 434 determines that the armature is properly postioned, then program execution proceeds to block 450, which processes one pump stroke at the desired time and rate. Next the command to perform one stroke is sent downhole in block 452, and then block 454 determines whether a stroke has been accomplished as directed. If not, block 456 delays a predetermined amount of time, and block 458 records the date and time of the failure. Then the stroke is attempted again.

If the stroke was performed properly, then program execution proceeds to block 460 which attempts to check the downhole temperature. If not successful, block 462 introduces a predetermined delay, and block 464 records the date, time, etc., of the failure.

If the temperature check was performed properly, then block 466 determines whether the predetermined delay has elapsed before beginning a new pump stroke. If so, program execution proceeds to block 434 to begin another stroke. Otherwise, an interval timer is started in block 470 and is checked for timeout in block 470. Upon timeout, program execution returns to block 434.

In operation, three phase AC electric power is provided via lines 10, 11, and 12 to varistor bank 14, which smooths line transients and voltage spikes. The smoothed power is supplied to rectifier circuit 24 via lines 18, 20, and 22, and is changed to pulsating DC power, which is supplied to a voltage regulator 30 for filtering and conversion to an acceptable voltage level for operating the electronic devices used in the circuit. Such regulated power is supplied to microcomputer 38 via lines 32, 34, and 36 and to current amp 40 via lines 42 and 44. The unregulated output of rectifier 24 is also supplied to current sensor 46, which in conjunction with microcomputer 38 keeps a running total of power consumption.

Microcomputer 38 operates in detail in accordance with the program described in connection with FIGS. 3A and 3B. In the following description of the overall operation of the preferred embodiment of the present invention, it is implicit that the operation is in accordance with such program, even though specific references to particular program steps will not be explicitly made.

Microcomputer 38 sends commands downhole in accordance with the aforementioned program via lines 60, 62, and 64, and receives information concerning downhole conditions via lines 68, 70, 72, 74, and 76. The command signals are amplified by current amplifier 40 and are then sent to SCR switch bank 54. Current sensor 46 monitors the current level and sends a shutdown signal to SCR switch 54 via line 59 and to current amplifier 40 via line 56 if the current becomes excessive.

Since three DC lines 90, 92, and 94 are used in the preferred embodiment to power the downhole linear motor, six individual SCR's are used in switch bank 54. The linear motor is caused to operate by applying DC power to lines 90, 92, and 94 in a predetermined sequence, which energizes coils 130–140 to provide the attractive and repulsive forces necessary to cause the motor armature 300 to move upwardly or downwardly as required.

The microcomputer also interprets coil temperature information and adjusts the power levels to prevent damage due to overheating. If power reduction does not alleviate the problem, then the system is automatically shut down. By controlling the duty cycle of the coils in this way, smaller coils can be used without the normal overheating problems that usually dictate in favor of large coils. Microcomputer 38 also provides a readout or recording of pressure, temperature, and other parameters. In addition to its downhole monitoring and controlling duties, the microcomputer may also be used for such functions as tank switching and reporting wellsite conditions and security information to a remote facility by radio or telephone links.

In the motor section as shown in FIG. 2A, the three power lines 90, 92, and 94 are contained in cable 232. The combined effect of the sequential switching and offset between coil assemblies 240–246 and the armature sections 316–322 is to cause armature 300 to move lengthwise of tube 222 either upwardly or downwardly depending upon the sequence in which power is applied to lines 90–94. The three wires permit adjacent coils to be generating either attractive or repulsive forces as needed to move armature 300 in the desired direction. Thus, while one coil may be attracting the armature section closest to it inside tube 222, its neighboring coil may be repulsing the armature section closest to it. A particular power application sequence for lines 90–94 is established for an upstroke, while the reverse sequence is used to cause a downstroke. By choosing the speed with which power is switched among lines 90, 92, and 94, the speed of the stroke may be controlled. Further, by choosing the time at which the upstroke sequence is changed to the downstroke sequence, the length of the motor stroke can be changed. In addition, by controlling the start of the power application sequence, the duty cycle of the motor can be controlled. The switching of the power to the coils rather than supplying power on a continuous basis permits the large current demands to be met by smaller coils without overheating.

Information about downhole conditions, such a the temperature, pressure, and position of armature 300 relative to position sensors 340, 342, and 344, are encoded as a sequence of audio tones in electronic package 341. These tones are imposed onto power lines 90, 92, and 94 by means of AC coupler/modulator 110 and are picked off the same lines at the surface by AC coupler/demodulator 78. Any one of several well-known encoding techniques may be used, and the encoded sequence can be imposed upon the power lines by frequency shift keying, on-off (continuous wave or CW), pulse width, pulse position, or other suitable modulation method. Information representing the outputs of the various types of downhole sensors can be sent simultaneously using different carrier tones. For example, one sensor might use a carrier of 2 KHz. while another might use a carrier of 8 KHz. These audio tones would modulate a carrier tone, such as 40 KHz, which is the preferable frequency in terms of noise immunity. In the alternative the information could be multiplexed using a single audio tone. Further, one type of information might be sent on line 90, another type of line 92, and another on line 94. In a further alternative, the information can be sent in digital form on one line and in analog form on another line for purposes of error checking at the surface. In addition, information can be sent either serially on a single line or in parallel three bits at a time using lines 90, 92, and 94. Information sent serially could be sent either synchronously or ansynchronously in accordance with well known telecommunications concepts.

The tones picked off by AC coupler 110 are changed to digital voltage levels by A/D converter 66, which are then decoded by microcomputer 38. Microcomputer 38 interprets the armature position information and appropriately controls SCR switch bank 54 in a manner to achieve the proper pump stroke length, speed, and duty cycle as previously described. In the event that the downhole temperature becomes excessive and computer 38 fails to control it, AC coupler 78 sends a shutdown signal to SCR switch 54 via line 79.

In the pump as illustrated in FIG. 2B, the upward and downward movement of armature 300 is transferred to drive rod 374 via couplings 310 and 314. As piston 376 moves downwardly on the downstroke of armature 300, ball 300 moves upwardly as fluid enters lower opening 378 and fills barrel 377. At the same time the downward motion of piston 376 forces ball 356 to seat in opening 354, thereby closing opening 354 to reverse passage of well fluids. When piston 376 moves upwardly on the upstroke of armature 300, ball 356 rises permitting more well fluid to be drawn into barrel 352. At the same time ball 380 seats in opening 378 permitting piston 376 to lift the well fluid inside barrel 377 and to force it into the interior of tubing 208 through openings 370 and 372. Further uphole in FIG. 2A, the well fluids previously produced are simultaneously forced through openings 312 into passage 306 and thence through openings 301 into the interior of tubing 204. At the same time some well fluids enter the area between tube 222 and the laminated armatures, such as 318. This permits the well fluids to act as a coolant to remove excess heat generated by magnetic inefficiencies in the armatures.

The pump of the present invention is capable of reciprocating at one to fifty or more strokes per minute without overtravel or undertravel. The preferable stroke rate for most marginal well pumping situations is four to fifteen strokes per minute. This rate is much higher than is normally used in the oil patch and will result in some sacrifice in efficiency in the narrower sense due to the absence of the inertial effect as a power amplification mechanism. The changed efficiency can be offset by using pumps having smaller diameters, but even with these efficiency limitations the linear pump herein described will be more efficient in the broader sense due to a better match between the pump operation and the production characteristics of low production reservoirs.

Using a linear motor of the type just described also results in lower overall power consumption at a wellsite. The elimination of the weight and friction associated with sucker rods will permit the motive power from a typical 25 horsepower to about 3 horseposer required by the present invention.

The structure of the linear motor also makes pulling the pump a relatively simple and fast operation. The inside diameter of tube 222 is substantially the same as that of tubing section 204, and the armature 300 is centralized and restrained vertically only by the magnetic field of the coil assemblies, such as 240. This means that armature 300 is completely free to move vertically inside tube 222. Thus removal of armature 300 and the sucker rod pump driven by the linear motor is as simple as attaching a fishing tool to fishing neck 302 and pulling the entire assembly from the tubing, leaving the field coil assembly in the well.

The use of a microcomputer provides significant advantages over current practices. Not only can a wellsite be remotely monitored and controlled but a completely flexible pump stroke is provided. Whereas in conventional sucker rod pumps the pump stroke is fixed, in the present invention the stroke length, speed, and cycle time can all be minutely and instantaneously controlled and changed to suit present well production conditions.

In addition to these technical merits, the present invention provides a number of other economic and operational advantages over conventional artificial gas lift methods, including the following:

1. A large amount of costly equipment is eliminated, including the pumping unit, gas motor, and sucker rods.

2. Components subject to wear are eliminated. These include gears, belts, bearings, polish rods, stuffing box, bridle line.

3. Freeze-ups in cold weather are eliminated.

4. Pollution from gas engines, well head leaks, and the like, is eliminated.

5. Elimination of sucker rods facilitates use in crooked or directionally drilled holes, does away with tubing wear, renders the use of a tubing anchor unnecessary, and removes the problem of pump overtravel and undertravel which result from the elasticity of long rod strings.

While particular embodiments of the present invention have been shown an described, it is obvious that minor changes and modifications may be made therein without departing from the true scope and spirit of the invention. It is the intention in the appended claims to cover all such changes and modifications.

What is claimed is:

1. In a production tubing string: a tube of non-magnetic material substantially of the same internal diameter as the tubing string; a plurality of electromagnetic coil assemblies disposed about the tube and equidistantly spaced along the length thereof; each of said coil assemblies comprising a coil circumfusing said tube, a first annular pole piece circumfusing said tube and positioned above said coil, a second annular pole piece circumfusing said tube and positioned below said coil, and a sleeve of magnetic material positioned about said coil and said first and second pole pieces and coextensive with the combined length thereof, a cylindrical case coextensive with and enclosing said tube and said coil assemblies; a separate mandrel of a non-magnetic material centrally positioned in said tube and removable therefrom; said mandrel having a central bore therein to permit the passage of production fluids therethrough; a plurality of armature sections equidistantly spaced along the mandrel, said spacing being different from the spacing of the coil assemblies along said tube; said armature sections being formed as a stack of disks of a magnetic material; a plurality of annular centralizers separating said armature sections; a fishing neck on said mandrel, whereby said mandrel and the components attached thereto may be removed through the tubing string without removing said tubing and components attached thereto; and means for energizing said coil assemblies in a predetermined sequence, whereby electromagnetic attractive and repulsive forces are created between said coil assemblies and the armature sections to thereby move said mandrel longitudinally inside said tube.

2. In a production tubing string as described in claim 1 wherein said energizing means comprises a plurality of electrical conductors connected in a predetermined sequence to said coils and means for selectively applying electrical power to said coils.

3. In a production tubing string as described in claim 2 further including means in association with said tube for sensing the position of said armature sections with respect to said coils and means for controlling said energizing means in reponse to said sensing means.

4. In a production tubing string as described in claim 3 wherein said controlling means further includes means for operating said mandrel and the components attached thereto in a reciprocating motion.

5. In a production tubing string as described in claim 4 further including means for controlling the length of travel of said mandrel and components attached thereto in said reciprocating motion.

6. In a production tubing string as described in claim 5 further including means for controlling the speed of travel of said mandrel and components attached thereto in said reciprocating motion.

7. In a production tubing string as described in claim 6 further including means for controlling the timing of the beginning of each cycle of said reciprocating motion of said mandrel and components attached thereto, 8. In a production tubing string as described in claim 2 wherein said applying means comprises a plurality of SCR's.

* * * * *